3,143,470
RABIES VIRUS PROPAGATION IN EMBRYONIC CELLS MAINTAINED IN A MEDIUM CONTAINING PANCREATIC DIGEST OF CASEIN
Burton I. Wilner, Grosse Pointe Farms, Mich., assignor to Parke, Davis & Company, Detroit, Mich., a corporation of Michigan
No Drawing. Filed Apr. 24, 1961, Ser. No. 104,840
4 Claims. (Cl. 167—78)

This invention relates to a process for producing aqueous solutions containing live rabies virus.

The rabies virus, unlike many of the other viruses, is quite unstable and multiplies slowly even under the most optimal conditions. These factors plus other less well-defined factors make this virus difficult to propagate for vaccine purposes. At the present time the materials used for rabies vaccine production are produced by the in vivo cultivation of the rabies virus in the brains of living rabbits or viable embryonated duck eggs, removal of the infected brains from the rabbits or the infected embryos from the eggs and maceration of the infected tissue in saline to obtain suspensions containing the live virus and infected macerated tissue. Rabies vaccines are produced from these suspensions by rendering the virus non-infective through treatment with phenol, β-propiolactone, or ultraviolet irradiation. These commercial vaccines contain 10 or 20% of duck embryo or rabbit brain tissue and are of such a potency that in immunization 100 mg. of these foreign tissues are injected each time the vaccine is administered. The non-viral proteins present in these vaccines give rise to numerous protein reactions, and particularly so because during the course of the immunization, which requires an injection every day for 14 consecutive days, the patient may build up a sensitivity to these foreign proteins. Additionally, rabies vaccines prepared from and containing rabbit brain materials have been reported to give rise to neurological side effects. Unfortuniately, the proteinaceous nature and size of the rabies virus have, to date, precluded any practical separation of the virus from the non-viral proteins which are present in the aforementioned virus suspensions and vaccines.

The rabies virus has also been propagated in vitro in aqueous media containing macerated embryonic mouse brain, embryonic rat brain, embryonic rabbit brain, and embryonic chick egg tissues, with and without serum, to obtain suspensions which, like the rabbit brain and duck embryo suspensions mentioned above, contain the live virus and a high percentage of non-viral proteins. Such suspensions have the same disadvantages as the rabbit brain and embryonic duck egg suspensions with respect to their possible use in the preparation of vaccines.

Attempts have also been made to propagate the rabies virus in cell cultures of non-embryonic, non-nervous tissues. These attempts, with the exception of one recent report, appear to have been unsuccessful and have involved the use of serum in the liquid portion of the culture. The successful propagation of the rabies virus in the aforementioned type of culture was accomplished by the use of cell cultures of hamster kidney tissue and nutrient media containing 0.5% hydrolyzed lactalbumin and varying amounts of various sera. It was found that progressively more virus was obtained in media which contained progressively more protein and that the virus yield also varied with the species of serum used. When no serum was used in the medium, that is, a medium which contained the protein present in the infected mouse brain tissue used as inocula but no other added proteins, little or no virus was obtained even after 12 days. The highest yields of virus were obtained by the use of a medium containing 20% horse serum. The aqueous solutions harvested from the cultures of hamster kidney cells in sera nutrient media contained not only the living virus but the serum proteins from the media. No vaccines were prepared from these solutions, but their high protein content would impart to any vaccines which might be prepared from them the same disadvantage of hypersensitization as is associated with the present commercial vaccines. Moreover, the proteins associated with animal sera, particularly those of horse serum, give rise to more numerous and severe protein reactions than are associated with the proteins from rabbit tissue and duck embryos and preclude the use of serum containing vaccines for human use. Additionally, the use of non-embryonic tissues in the preparation of the cell cultures introduces the problem of the contamination of the cultures with so-called "wild viruses," that is, other viruses which may be present in the hamster kidneys used for the preparation of the cell culture. Such "wild viruses" might give rise to very serious practical problems if one were to attempt to use such culture liquids for vaccine production.

It is an object of the present invention to provide a process for propagating rabies virus to produce aqueous solutions which contain a substantial amount of the live rabies virus but no suspended non-viral tissue material and substantially no non-viral proteins.

It is also an object of the invention to provide a process for propagating rabies virus without contamination by "wild viruses."

A further object of the invention is to provide a process for the in vitro propagation of rabies virus which involves multiple harvests of infected fluids from the living cell substrate and consequently great economies in the quantity of substrate material required.

Still another object of the invention is to provide aqueous solutions which contain sufficiently large amounts of live rabies virus to permit their use in the production of rabies vaccines.

Yet another object of the invention is to provide aqueout solutions of live rabies virus which are of such purity that the rabies vaccines prepared from them can be concentrated many fold without exceeding the protein content of the presently available commercial vaccines and moreover do not contain any egg constituents or reactive brain materials which give rise to the allergenic and neurological side effects obtained by the use of the present commercial vaccines.

In accordance with the invention the above objects and other objects which will become apparent hereinafter are realized by incubating an embryonic cell monolayer infected with live rabies virus in a sterile, protein-free, aqueous, cell-maintenance medium containing pancreatic digest of casein under aseptic conditions until a substantial quantity of live rabies virus is present in the culture liquid; removing the culture liquid containing the live rabies virus from the infected, intact, embryonic cell monolayer without disrupting the monolayer; adding fresh sterile, protein-free, aqueous cell maintenance medium containing pancreatic digest of casein to the infected, intact, embryonic cell monolayer; incubating the culture under aseptic conditions until a substantial quantity of live rabies virus is present in the culture liquid; removing the culture liquid from the infected, intact, embryonic cell monolayer without disrupting the monolayer; and repeating the addition of the sterile cell maintenance medium containing pancreatic digest of casein, incubation of the culture and separation of the culture liquid containing the live rabies virus until the cell monolayer degenerates.

The aqueous solutions or culture liquids containing live rabies virus obtained by the process of the invention contain no "wild viruses," no suspended non-viral tissue material, and are substantially free from non-viral proteins. The expressions "substantially free from non-viral proteins" and "substantially no non-viral proteins" as used herein in connection with the culture liquids of the invention means that the culture liquids contain very little or no protein of non-viral origin. Theoretically, the culture liquids of the invention are completely free from such proteins because no non-viral proteins are used in the aqueous phase of the cultures. However, due to the limitations of present day analytical methods it is not possible to establish this by chemical analysis and attempts to use such analytical methods often produce misleadingly high results in this and similar situations.

The culture liquids produced by the process of the invention contain sufficiently large amounts of live rabies virus to permit their use in the production of "killed" rabies vaccines. The titre of the culture liquids produced by the process of the invention is naturally dependent somewhat on the incubation period between harvests and other factors, but in general the infectivity titre of the culture liquids is about $10^{2.5}$ to $10^5 LD_{50}$ per milliliter when determined by the standard mouse titration procedure. Because the culture liquids of the invention contain substantially no non-viral proteins the vaccines produced from them can, if desired, be concentrated manyfold without rendering the vaccine unusable or undesirably reactive due to the presence of large amounts of non-viral proteins. This not only makes it possible to employ for vaccine production those culture liquids which would otherwise not be suitable due to too low a viral content but also to ultimately produce, by concentration, usable "killed" vaccines of standardized potency which contain more antigenic material than has heretofore been possible.

The embryonic cell monolayers infected with live rabies virus used as starting materials in the practice of the invention are prepared by inoculating a sterile culture composed of an embryonic cell monolayer and an aqueous cell maintenance medium containing supplementary proteinaceous materials or pancreatic digest of casein with live rabies virus, incubating the culture until the cell monolayer becomes infected with the living virus and removing the cell maintenance medium without disruption of the infected, intact, embryonic cell monolayer. After removal of the cell maintenance medium it is preferable to wash the infected monolayer with an aqueous salt solution such as Hank's Balanced Salt Solution or isotonic saline to remove any occluded proteins. The incubation is carried out at a temperature of 30 to 37° C., preferably at about 32° C., and for about 1 to 7 days. The incubation or infection period is not particularly critical. The results obtained with cell monolayers infected during an incubation period of one day are equally satisfactory as those obtained with cell monolayers infected during an incubation period of four days. The aqueous cell maintenance medium can be any of those customarily used for the in vitro propagation or maintenance of cells. For example, one may use Hank's Balanced Salt Solution or "Medium No. 199" supplemented with serum or other proteinaceous materials. Variants of "Medium No. 199" can also be used. Instead of supplementing the medium with proteinaceous materials like serum one may also use pancreatic digest of casein in concentrations of 0.3 to 0.9%. When a serum is used as the supplement it may be used in concentrations from about 3% to 20%, and those sera, such as horse and calf, which have a high protein content are preferred.

The nature of the inocula containing live rabies virus which is used to infect the embryonic cell monolayers is not critical. One may use a culture liquid produced by the process of the invention, an aqueous suspension of rabbit or mouse brain tissue infected with rabies virus, an aqueous suspension of fowl embryo tissue infected with rabies virus, or other materials containing live fixed or street rabies virus.

The embryonic cell monolayers which are used in the preparation of the infected cell monolayers are prepared in the known manner by cultivating cells obtained from embryonic tissue in an aqueous cell-maintenance medium containing serum. The preferred source of such cells are avian embryos, particularly the embryos of chickens and ducks.

The composition and amount of the sterile, protein-free, aqueous, cell-maintenance medium used in carrying out the process is not critical. Any of the conventional sterile, protein-free, aqueous cell-maintenance media used for the in vitro maintenance or growth of cells can be employed. For example, one may use Medium No. 199, Eagle's Medium, Melnick's SM-2 Medium, and Hank's Balanced Salt Solution. Media such as Medium No. 199 and Eagle's Medium, which contain amino acids, vitamins, non-proteinaceous growth factors, sugars, and inorganic salts are preferred. Such media are customarily supplemented with, or contain, antibiotics such as penicillin (about 100 units/ml.) and streptomycin (100 mcg./ml.) to minimize the possibility of bacterial contamination. Optionally, sugars such as glucose and lactose (about 1 to 2% by weight) can be added for cell nutrition in those cases where they are not a part of the standard medium being used. Sufficient of the aqueous cell-maintenance medium should be used to completely cover the cell monolayer, provided ample nutrition for the maintenance of the cells, and dilute the toxic metabolic products of the cells which would otherwise destroy the cells. In general, a minimum of approximately three times the amount necessary to cover the cell monolayer should be used. There is no maximum amount of medium which can be used, but from the practical standpoint too large amounts lead to undesirably dilute culture fluids and increase in operating costs. The amount which is customarily used is about 5 to 10 times the quantity necessary to cover the cell monolayer.

The pancreatic digest of casein which is used as a supplement in the sterile, protein-free, aqueous, cell maintenance medium is prepared as described in The Pharmacopeia of the United States, XIV, pages 875–876. It can be employed in concentrations ranging from 0.3 to 0.9% by weight. If less than 0.3% by weight is used, satisfactory yields of the rabies virus are not obtained, while if concentrations greater than 0.9% by weight are used the yield of the rabies virus is not appreciably increased. The preferred concentration is from 0.5 to 0.7% by weight.

The incubation of the embryonic cell monolayer infected with live rabies virus in the protein-free aqueous cell-maintenance medium containing pancreatic digest of casein is carried out at temperature of 30 to 37°C. The preferred temperature is about 32° C., that is, 32° C.±1° C. The incubation is continued until a substantial quantity of live rabies virus is present in the culture liquid, that is, until the culture liquid has an infectivity titre of $10^{2.5}$ or more per milliliter. In general, such concentrations are obtained within the first 24 hours of incubation. The culture liquids therefore can be harvested and the fluid portion of the culture replaced every 24 hours, or in such longer time intervals as is desired. Because the living rabies virus is not very stable and for reasons of economy, harvests should be made at intervals of about 1 to 10 days, preferably at 1 to 7 day intervals. Harvesting of the culture liquids and replacement of the liquid portion of the culture with fresh sterile, protein-free, aqueous cell-maintenance medium containing pancreatic digest of casein is repeated until the embryonic cell monolayers degenerate, or for about 20 days. The incubation, harvesting, preparation of starting materials, etc., are carried out using the accepted tissue culture techniques, that is, using aseptic conditions, sterile materials (other than the live rabies virus), and sterile apparatus.

The invention is illustrated by the following example:

EXAMPLE

A. Cell Culture Preparation

Whole chick embroys are aseptically removed from 11–13-day-old viable embryonated eggs. The heads are removed and discarded. The bodies of the embryos are cut into 1–3 mm. pieces and suspended in Hank's Balanced Salt Solution, contatining 0.0025 g./ml. of trypsin having a potency such that 1 part of the trypsin will digest 250 parts of casein under the Pharmacopeia of the United States test for trypsin in pancreatin. 100 ml. of the trypsin-containing Hank's Balanced Salt Solution are used for each 10 to 15 ml. of embryo pieces and the initial temperature of the solution is 37° C.

The suspension is placed in a trypsinizing flask and stirred for six minutes at room temperature. The semiclear supernatant fluid containing the suspended chick embryo cells is decanted into a chilled flask and a fresh portion of the trypsin-containing Hank's Balanced Salt Solution added to the residual tissue. The suspension is stirred for six minutes at room temperature. The supernatant liquid is removed and added to the original extract. The procedure is repeated an additional two times or until no tissue debris remains.

The chilled extract containing the suspended cells is centrifuged under refrigeration at 2000 r.p.m. for 15 minutes, the supernatant fluid removed by decantation and discarded. The cell pellet is resuspended in and washed with Hank's Balanced Salt Solution, the volume of solution used being equal to one-half the volume of the suspension originally centrifuged. The suspension is centrifuged again and the supernatant liquid removed and discarded. The cell pellet is resuspended in the synthetic medium known as Medium No. 199 to which 5% by volume of calf serum, 100 units/ml. of penicillin and 100 mcg./ml. of streptomycin have been added. The pH of the suspension is adjusted to 7.0 and the concentration of cells determined by a crystal violet nuclei count using a hemocytometer. Additional modified Medium No. 199 is added to bring the concentration of cells to $10^6$ per ml. and the pH again adjusted, if necessary, to 7.0. Fifty-ml. portions of the cell suspension are placed in sterile 28-ounce flat-sided bottles and the bottles stoppered. The bottles are incubated on their flat sides at 37° C. for 2 days. The bottles are removed from the incubator and examined for formation of a complete, healthy cell monolayer on the immersed surfaces of the bottle interiors. The nutrient fluid is removed from the bottles containing a complete cell monolayer and the monolayers each washed once with 75 ml. of Hank's Balanced Salt Solution.

All of the above operations are carried out aseptically and with sterile reagents.

B. Virus Seed

CVS fixed rabies virus seed (20% mouse brain suspension containing 2% horse serum) obtained from the National Institutes of Health, United States Department of Health, Education and Welfare, is diluted a thousand-fold with distilled water and 0.03 ml. portions of the solution injected intracerebrally into 11–13 gram mice. The brains of the mice showing paralysis or neurological symptoms (generally about 5 days after inoculation) are aseptically harvested and macerated in sterile distilled water in a blender at high speed for 30 seconds. Additional sterile distilled water, horse serum and streptomycin are added to make a 20% mouse brain suspension in distilled water containing 2% horse serum and 100 mcg./ml. of streptomycin. If the seed so prepared is not to be used within a short time, it is ampouled and frozen. Just prior to use the seed suspension is diluted with an equal volume of sterile distilled water and the suspension centrifuged under refrigeration at 1000 r.p.m. for 15 minutes. The supernatant fluid is removed and used for inoculating the cell cultures as described below.

C. Infection of Cell Monolayers With the Virus

The supernatant fluid prepared above containing live rabies virus, mouse brain tissue and horse serum is diluted under aseptic conditions with 99 parts of a sterile, protein-free, nutrient medium composed of Medium No. 199 containing 0.6% by weight of a pancreatic digest of casein (Pharmacopeia of the United States, XIV, pp. 875–876), 1.4% by weight of lactose, 100 units/ml. of penicillin and 100 mcg./ml. of streptomycin. 50 ml. portions of the inoculated nutrient medium so obtained are aseptically introduced into each of the bottles containing the chick embryo cell monolayers prepared as described above. The inoculated cultures are incubated at 32° C. for 24 hours. The liquid nutrient medium which contains the proteins introduced by the inoculation and some of the live virus of the inoculum is removed from each of the bottles and discarded. The intact cell monolayers infected with live rabies are washed with Hank's Balanced Salt Solution and used in the next step of the process.

D. Incubation of Infected Cell Monolayers and Harvest of Culture Liquids 50 ml. of sterile Medium No. 199 containing 0.6% by weight of pancreatic digest of casein, 1.4% by weight of lactose, 100 units/ml. of penicillin and 100 mcg./ml. of streptomycin is aseptically introduced into each of the culture bottles containing a cell monolayer infected with live rabies virus from which the medium has been removed. The cultures are incubated at 32° C. for 1 to 7 days. At the end of this time, the culture liquid containing the live rabies virus but no non-viral proteins is removed from the culture bottles, pooled and stored at 4° C.

Fresh 50-ml. portions of the sterile nutrient medium are added aseptically to each of the culture bottles containing the infected, intact, chick embryo cell monolayers from which the nutrient medium has been removed and the cultures again incubated at 32° C. for 1 to 7 days. The culture liquid is harvested as before, the nutrient medium of the cultures replaced, and the cultures again incubated. This procedure is repeated for a total of about two weeks, or until the chick embryo cell monolayers degenerate from age as indicated by their breaking away from the walls of the culture bottles.

The following table summarizes the yields of rabies virus in the culture fluids obtained by the above procedure in parallel experiments in which the time of harvest of the culture fluids and the time used for infection of the cell monolayers was varied. The results are expressed in terms of $Log_{10}LD_{50}$/ml. of rabies virus infectivity as determined by the standard mouse titration procedure which involves the intracerebral inoculation of the mice with 0.03 ml. of serial dilutions of the culture fluids. The figures represent in each case the results obtained on the pooled harvest from at least three culture broths.

TABLE

| Days of inoculation of infected cell monolayers | Cell monolayers infected by 24 hours of incubation | | | Cell monolayers infected by 96 hours of incubation | |
|---|---|---|---|---|---|
| | Sample No. 1 $Log_{10}$ $LD_{50}$/ml. | Sample No. 2 $Log_{10}$ $LD_{50}$/ml. | Sample No. 3 $Log_{10}$ $LD_{50}$/ml. | Sample No. 4 $Log_{10}$ $LD_{50}$/ml. | Sample No. 5 $Log_{10}$ $LD_{50}$/ml. |
| 0 | ---------- | ---------- | ---------- | ---------- | ---------- |
| 1 | ---------- | ---------- | ---------- | 2.8 | ---------- |
| 2 | ---------- | ---------- | ---------- | 3.4 | 3.3 |
| 3 | 2.9 | 2.9 | ---------- | 2.5 | ---------- |
| 4 | *2.0 | ---------- | ---------- | 2.5 | 3.3 |
| 5 | 3.0 | 3.3 | ---------- | 2.3 | ---------- |
| 6 | 3.2 | ---------- | 4.1 | 2.9 | ---------- |
| 7 | 2.5 | 3.4 | ---------- | 2.9 | 3.0 |
| 8 | 3.5 | ---------- | ---------- | 2.9 | ---------- |
| 9 | 2.7 | ---------- | ---------- | 3.2 | *1.9 |
| 10 | 2.9 | 3.0 | ---------- | 3.8 | ---------- |
| 11 | 3.0 | ---------- | ---------- | 3.2 | 3.0 |
| 12 | 3.4 | 3.3 | ---------- | ---------- | ---------- |
| 13 | 3.7 | ---------- | 3.2 | ---------- | ---------- |

*Questionable analytical result.

1. Infectivity titre ($Log_{10}LD_{50}$/ml.) of culture liquid immediately after addition of live rabies virus to the cultures of the non-infected cell monolayers: 4.2 for each sample.

2. Infectivity titre ($Log_{10}LD_{50}$/ml.) of culture liquid removed after infection of cell monolayers with live rabies virus: Samples 1, 2 and 3=3; Samples 4 and 5=4.5.

The culture liquids prepared as described above can be converted to "killed" rabies vaccines by the use of the same procedures as are currently in use for the production of such vaccines from aqueous suspensions containing live rabies virus. Due to the complete or virtual absence of non-viral proteins in the culture liquids less drastic inactivation conditions can be used. For example, one can inactivate a culture liquid of the invention having a titre of $10^{5.1}LD_{50}$/ml. by ultraviolet irradiation in a Dill irradiation unit, using a flow rate of 400 ml. per minute and irradiation of intensity of 10,000$\mu$ watts sec./cm.$^2$.

I claim:

1. Process for the production of culture liquids containing live rabies virus which comprises incubating an embryonic cell monolayer infected with live rabies virus in a sterile, protein-free, aqueous, cell-maintenance medium containing at least 0.3% by weight of pancreatic digest of casein under aseptic conditions until a substantial quantity of live rabies virus is present in the culture liquid and removing the culture liquid containing the live rabies virus from the infected, intact, embryonic cell monolayer without disrupting the monolayer.

2. Process for the production of culture liquids containing live rabies virus which comprises incubating an embryonic cell monolayer infected with live rabies virus in a sterile, protein-free, aqueous, cell-maintenance medium containing at least 0.3% by weight of pancreatic digest of casein under aseptic conditions at a temperature of 30 to 37° C. for 1 to 10 days; removing the culture liquid containing live rabies virus from the infected, intact, embryonic cell monolayer without disrupting the monolayer; adding sterile, protein-free, aqueous, cell-maintenance medium containing at least 0.3% by weight of pancreatic digest of casein to the infected, intact, embryonic cell monolayer to replace the removed culture liquid; incubating the culture under aseptic conditions at a temperature of 30 to 37° C. for 1 to 10 days; removing the culture liquid containing live rabies virus from the infected, intact, embryonic cell monolayer without disrupting the monolayer; and repeating the addition of the sterile, protein-free, aqueous cell-maintenance medium containing at least 0.3 by weight of pancreatic digest of casein to the infected, intact, embryonic cell monolayer, incubation of the culture and removal of the culture liquid containing live rabies virus until the cell monolayer degenerates.

3. Process for the production of culture liquids containing live rabies virus which comprises incubating a chick embryo cell monolayer infected with live CVS fixed rabies virus in a sterile, protein-free, aqueous cell-maintenance medium containing 0.5 to 0.7% by weight of pancreatic digest of casein under aseptic conditions at a temperature of 30 to 37° C. for 1 to 7 days; removing the culture liquid containing live CVS fixed rabies virus from the infected, intact, chick embryo cell monolayer without disrupting the monolayer; adding sterile, protein-free, aqueous, cell-maintenance medium containing 0.5 to 0.7% by weight of pancreatic digest of casein to the infected, intact, chick embryo cell monolayer to replace the removed culture liquid; incubating the culture under aseptic conditions at a temperature of 30 to 37° C. for 1 to 7 days; removing the culture liquid containing live CVS fixed rabies virus from the infected, intact, chick embryo cell monolayer without disrupting the monolayer; and repeating the addition of the sterile, protein-free, aqueous cell-maintenance medium containing 0.5 to 0.7% by weight of pancreatic digest of casein to the infected, intact, chick embryo cell monolayer, incubation of the culture and removal of the culture liquid containing live CVS fixed rabies virus until the cell monolayer degenerates.

4. Process for the production of culture liquids containing live rabies virus which comprises incubating a chick embryo cell monolayer infected with live CVS fixed rabies virus in a sterile protein-free, aqueous cell-maintenance medium comprising Medium No. 199 and containing 0.5 to 0.7% by weight of pancreatic digest of casein under aseptic conditions at a temperature of about 32° C. for 1 to 7 days; removing the culture liquid containing live CVS fixed rabies virus from the infected, intact, chick embryo cell monolayer without disrupting the monolayer; adding sterile, protein-free, aqueous cell-maintenance medium comprising Medium No. 199 and containing 0.5 to 0.7% by weight of pancreatic digest of casein to the infected, intact, chick embryo cell monolayer to replace the removed culture liquid; incubating the culture under aseptic conditions at about 32° C. for 1 to 7 days; removing the culture liquid containing live CVS fixed rabies virus from the infected, intact, chick embryo cell monolayer without disrupting the monolayer; and repeating the addition of the said sterile, protein-free, aqueous cell-maintenance medium and 0.5 to 0.7% of pancreatic digest of casein to the infected, intact, chick embryo cell monolayer, incubation of the culture and removal of the culture liquid containing live CVS fixed rabies virus until the cell monolayer degenerates.

References Cited in the file of this patent

UNITED STATES PATENTS 2,912,361 Froelich -------------- Nov. 10, 1959

OTHER REFERENCES

Murray et al., A Bibliography of the Research in Tissue Culture, 1884 to 1950, vol. 1, page 283, pub. by Academic Press, Inc., N.Y.C.

Sanders, AMA Archives of Pathology, Aug. 1953, pages 148–166 and 210–211.

Dissertation Abstracts, vol. 15, page 1480, 1955.

Block, Amino Acid Handbook, page 266, pub. 1956 by Charles C. Thomas.

Kissling, Proc. Soc. Exp. Biol. and Med., June 1958, pages 223–225, vol. 98, no. 2.

Rhodes, "Textbook of Virology," 3rd ed., 1958, pages 41–52, pub. by Williams and Wilkins Co., Baltimore, Md.

May, "On the Use of Casein Hydrolysate as Nutrient Medium for Tissue Cultures," Zol. Bakt. 175, pp. 481–484, Aug. 1959; per Index Medicus I, S–432 (1960).